(12) United States Patent
Oks et al.

(10) Patent No.: US 10,216,777 B2
(45) Date of Patent: *Feb. 26, 2019

(54) SCALABLE INDEX BUILD TECHNIQUES FOR COLUMN STORES

(71) Applicant: Microsoft Technology Licensing, LLC, Redmond, WA (US)

(72) Inventors: Artem Oks, Kirkland, WA (US); Qingqing Zhou, Santa Clara, CA (US); Srikumar Rangarajan, Sammamish, WA (US); Aleksandras Surna, Redmond, WA (US); Wey Guy, Redmond, WA (US); Cipri Clinciu, Sammamish, WA (US); Ashit Gosalia, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/407,110

(22) Filed: Jan. 16, 2017

(65) Prior Publication Data
US 2017/0124128 A1 May 4, 2017

Related U.S. Application Data

(63) Continuation of application No. 14/662,108, filed on Mar. 18, 2015, now Pat. No. 9,547,677, which is a (Continued)

(51) Int. Cl.
*G06F 17/30* (2006.01)
*G06F 9/50* (2006.01)
*H04L 12/911* (2013.01)

(52) U.S. Cl.
CPC ...... *G06F 17/30315* (2013.01); *G06F 9/5083* (2013.01); *G06F 17/30321* (2013.01); *G06F 17/30474* (2013.01); *H04L 47/82* (2013.01)

(58) Field of Classification Search
CPC .......... G06F 17/3002; G06F 17/30094; G06F 17/30312; G06F 17/30946
See application file for complete search history.

(56) References Cited

U.S. PATENT DOCUMENTS 5,692,182 A * 11/1997 Desai ................ G06F 17/30445
5,940,819 A   8/1999 Beavin et al.
(Continued)

OTHER PUBLICATIONS

"Meeting Your Scalability Needs with IBM DB2 Universal Database Enterprise—Extended Edition for Windows NT", Retrieved at <<http://www.sigmod.org/disc/disc99/disc/ibm/eeent_all.pdf>>, Apr. 1998.
(Continued)

*Primary Examiner* — Alexander Khong
(74) *Attorney, Agent, or Firm* — Davin Chin; Chin IP, PLLC

(57) ABSTRACT

Architecture that includes an index creation algorithm that utilizes available resources and dynamically adjusts to successfully scale with increased resources and be able to do so for any data distribution. The resources can be processing resources, memory, and/or input/output, for example. A finer level of granularity, called a segment, is utilized to process tuples in a partition while creating an index. The segment also aligns with compression techniques for the index. By choosing an appropriate size for a segment and using load balancing the overall time for index creation can be reduced. Each segment can then be processed by a single thread thereby limiting segment skew. Skew is further limited by breaking down the work done by a thread into parallelizable stages.

20 Claims, 7 Drawing Sheets

Related U.S. Application Data continuation of application No. 12/727,266, filed on Mar. 19, 2010, now Pat. No. 8,990,216.

(56) References Cited

U.S. PATENT DOCUMENTS

| | | | |
|---|---|---|---|
| 7,158,996 | B2 | 1/2007 | Croisettier et al. |
| 7,685,109 | B1* | 3/2010 | Ransil .............. G06F 17/30336 707/999.003 |
| 2005/0251524 | A1* | 11/2005 | Shukla .............. G06F 17/30321 |
| 2008/0071755 | A1* | 3/2008 | Barsness ........... G06F 17/30595 |
| 2008/0313189 | A1 | 12/2008 | Mehta et al. |
| 2009/0254516 | A1 | 10/2009 | Meiyyappan et al. |
| 2009/0271385 | A1 | 10/2009 | Krishnamoorthy et al. |
| 2010/0332660 | A1 | 12/2010 | Fonseca et al. |

OTHER PUBLICATIONS

Ivanov A, et al., "Self-organizing Strategies for a Column-store Database", Retrieved at <<http://old-www.cwi.nl/themes/ins1/publications/docs/IvKeNe:EDBT:08.pdf>>, Proceedings of the 11th international conference on Extending database technology: Advances in database technology, Mar. 25-30, 2008.

Nicola, et al., "Enhance Business Insight and Scalability of XML Data with New DB2 9.7 pureXML features", Retrieved at <<http://www.ibm.com/developerworks/data/library/techarticle/dm-0904db297purexml/>>, Apr. 23, 2009.

Sargent, Daniel M., "SPD Server 4.1: Scalability Solution for SAS Turning Big Data into Business and Analytic Intelligence", Retrieved at <<http://support.sas.com/md/scalability/papers/SASScalablePerformanceDataServer4.1.pdf>>, Jan. 7, 2010.

"Final Office Action Issued in U.S. Appl. No. 12/727,266", dated Jun. 1, 2012, 14 Pages.

"Final Office Action Issued in U.S. Appl. No. 12/727,266", dated May 21, 2013, 17 Pages.

"Final Office Action Issued in U.S. Appl. No. 12/727,266", dated Apr. 23, 2014, 16 Pages.

"Non Final Office Action Issued in U.S. Appl. No. 12/727,266", dated Oct. 4, 2013, 17 Pages.

"Non Final Office Action Issued in U.S. Appl. No. 12/727,266", dated Dec. 7, 2012, 15 Pages.

"Non Final Office Action Issued in U.S. Appl. No. 12/727,266", dated Dec. 30, 2011, 11 Pages.

"Notice of Allowance Issued in U.S. Appl. No. 12/727,266", dated Nov. 14, 2014, 8 Pages.

"Final Office Action Issued in U.S. Appl. No. 14/662,108", dated Apr. 20, 2016, 14 Pages.

"Non Final Office Action Issued in U.S. Appl. No. 14/662,108", dated Oct. 6, 2015, 20 Pages.

"Notice of Allowance Issued in U.S. Appl. No. 14/662,108", dated Sep. 6, 2016, 9 Pages.

Zhou, et al., "An Adaptable Distributed Query Processing Architecture", In Journal Data & Knowledge Engineering, vol. 53, Issue 03, Oct. 20, 2004, pp. 283-309.

\* cited by examiner

SCALABLE INDEX BUILD TECHNIQUES FOR COLUMN STORES

CROSS-REFERENCE TO RELATED APPLICATION(S)

This application is a continuation of U.S. patent application Ser. No. 14/662,108, filed Mar. 18, 2015, entitled "SCALABLE INDEX BUILD TECHNIQUES FOR COLUMN STORES", which is a continuation of U.S. patent application Ser. No. 12/727,266, filed Mar. 19, 2010, entitled "SCALABLE INDEX BUILD TECHNIQUES FOR COLUMN STORES". The entirety of each of these aforementioned applications is incorporated herein by reference.

BACKGROUND

Advances in computer technology and the general mobility of users and expansiveness of corporate enterprises have generally contributed to the increase in computer applications in various industries in order to provide more efficient and effective communications and data handling. Database management systems are utilized in ways that improve the efficiency and reliability in not only making information available but also communicating information between servers. A database is an organized collection of information with data structured such that a program can quickly search and select desired pieces of data, for example. Databases can store content by rows or columns. Each has advantages, such as in data warehousing, where aggregates are computed over a large number of data items.

Scalability is an ongoing problem with evolving changes in corporate size and location. Additionally, systems are limited in the use of different algorithms for partitioned and non partitioned tables of the content.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture includes an index creation algorithm that utilizes available resources and dynamically adjusts to successfully scale with increased resources and for any data distribution. The resources can be processing resources, memory, and/or input/output, for example. A finer level of granularity, called a segment, is utilized to process tuples in a partition while creating an index. The segment also aligns with compression techniques for the index. By choosing an appropriate size for a segment and using load balancing the overall time for index creation can be reduced. Each segment can then be processed by a single thread thereby limiting segment skew. Skew is further limited by breaking down the work done by a thread into parallelizable stages.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
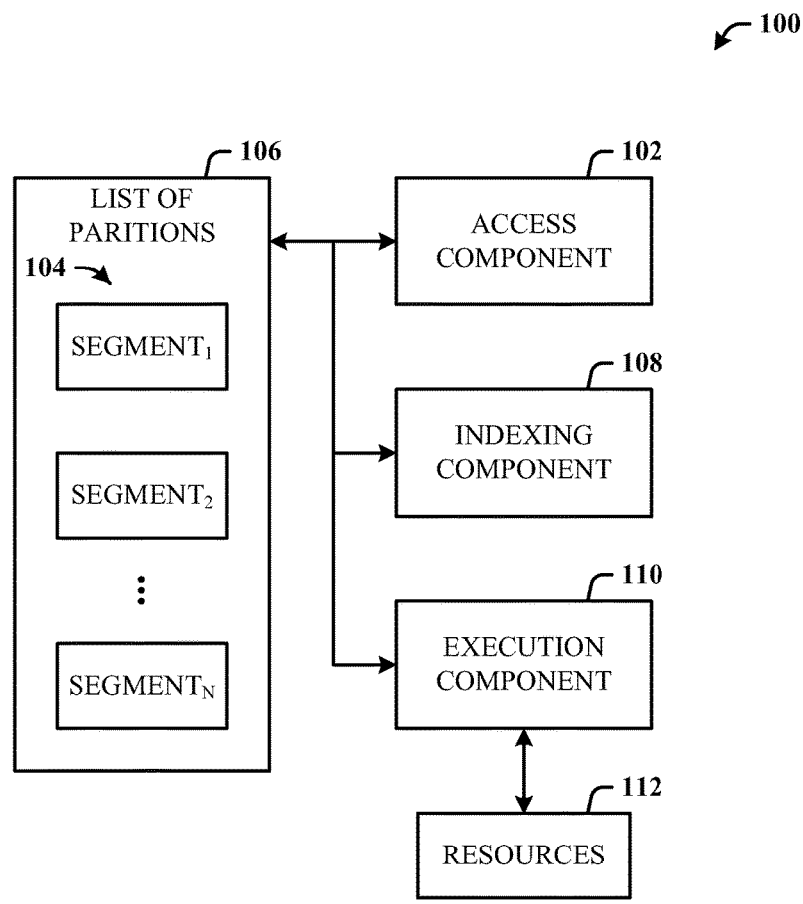
FIG. 1 illustrates a computer-implemented indexing system in accordance with the disclosed architecture.

Column-based stores for a database can dramatically increase the performance of data warehouse queries. Index creation is a part of a successful column store implementation. A well-designed index creation algorithm can utilize available resources and dynamically adjust to successfully scale with increased resources and be able to do so for any data distribution. The resources can be processing resources, memory, and/or input/output, for example.

The disclosed architecture provides the above aspects by employing segment granularity rather than partitions to build an index. The architecture employs a staged processing pipeline within a segment that allows helper threads to share the work in the segment. Moreover, the same algorithm can be used for partitioned and non-partitioned tables by considering a non-partitioned table as a partitioned table with only one partition.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented indexing system 100 in accordance with the disclosed architecture. The system 100 can include an access component 102 that accesses segments 104 of a list of partitions 106 as part of processing a query. An indexing component 108 indexes the segments 104 for processing the query. An execution component 110 of the system 100 manages processing of the segments 104 based on available resources 112.

The access component 102 accesses a datastore that can be a column store or a row store to obtain the list of partitions 106. Each of the segments 104 can be processed by a single thread to manage skew. The execution component 110 assigns helper threads to process segments to minimize overall index build time. The partitions include a partitioned table, and non-partitioned table that is considered a partitioned table of only one partition. The execution component 110 concurrently works on multiple segments of a partition to reduce memory usage or concurrently works on different partitions to reduce input/output contention.

Figure 2:
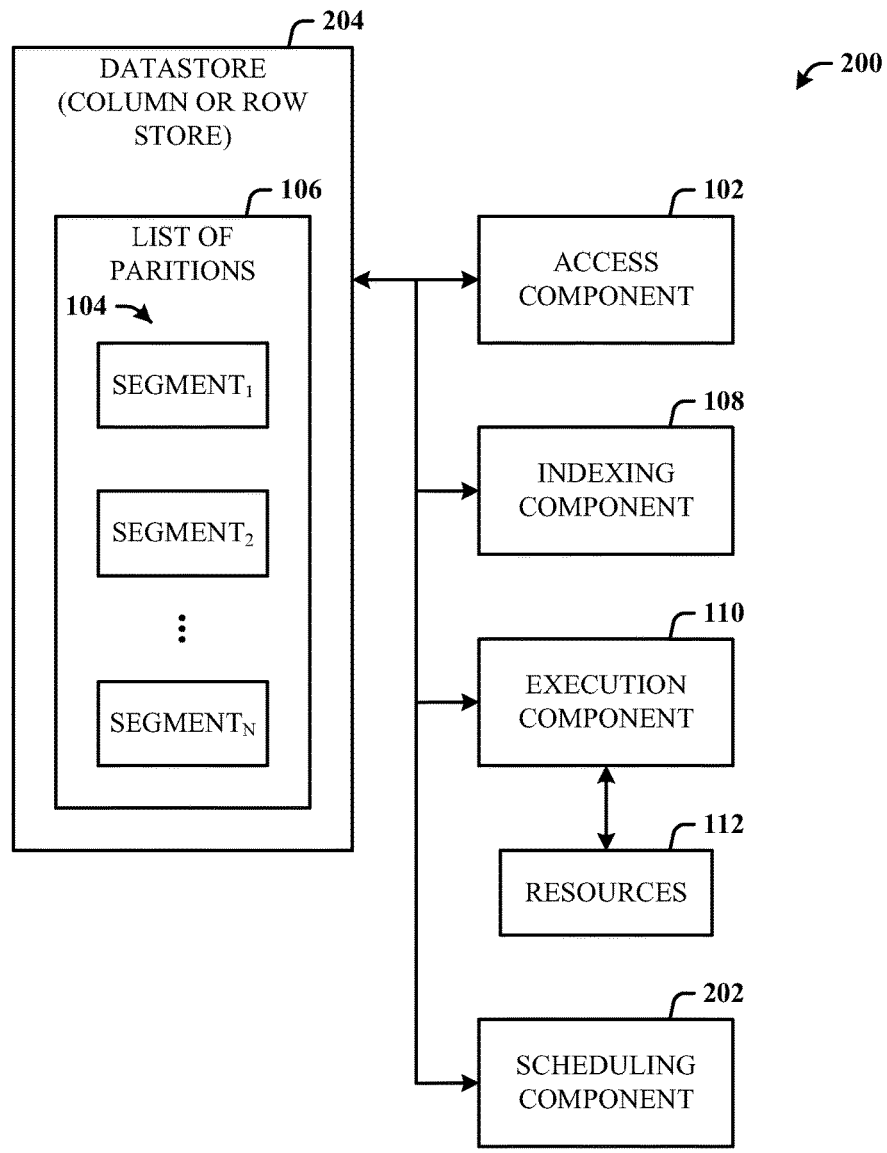
FIG. 2 illustrates an alternative embodiment of an indexing system that further includes a scheduling component for scheduling work to the resources.

FIG. 2 illustrates an alternative embodiment of an indexing system 200 that further includes a scheduling component 202 for scheduling work to the resources. The scheduling component 202 assigns segments to worker threads according to load balancing across on the resources. The load balancing can be based on segment size and the number of the worker threads. The worker threads can work on the same or different segments concurrently.

Put another way, the system 200 comprises the access component 102 that accesses a datastore 204 to obtain the list of partitions 106 and corresponding segments 104 as part of processing a query. The datastore 204 can be a column store and/or a row store. The indexing component 108 indexes the segments 104 for processing the query. The scheduling component 202 operates as described above, and the execution component 110 processes the segments 104 concurrently based on the available resources 112.

The execution component 110 assigns helper threads to process segments to minimize overall index build time. The partitions 106 include a partitioned table, and non-partitioned table that is considered a partitioned table of only one partition. The execution component 110 concurrently works on multiple segments of the partition 106 to reduce memory usage. The execution component 110 can concurrently work on different partitions to reduce input/output contention.

The algorithm to build (create) an index is also referred to as an index build plan. The same plan can be used for both partitioned and non-partitioned tables. (The non-partitioned table is a special case of a partitioned table with only one partition.) The plan can be described, as follows.

Before a query is executed a plan needs to be compiled. During query plan compilation, a list of partitions with corresponding segments is retrieved from the storage engine which manages the row store or column store. This list is used as a driver to for the actual index build operator. Alternatively, the list of partitions can b dynamically generated during query execution.

During query execution time, query execution can dynamically adjust the degree of parallelism and memory usage before execution starts, so that available machine resources can be fully utilized at the time of execution. A pull method (referred to as a demand exchange operator) can be used to extract the list of segments to work on. This helps to balance the load.

The provider provides partition/segment identifier (ID) tuples to drive the per segment index build operation. Multiple worker threads can work on the same or different segments concurrently, and load balancing can be achieved through the number of worker threads and the size of each segment. A segment is not shared between threads unless the concurrency level cannot utilize the available processor resources or processing more segments would require more than the available memory. In this case, helper threads are employed to assist with particular stages of processing a single segment.

The assignment of segments to threads is a scheduling and load balancing problem. The exact method of scheduling can account for CPU contention, IO (input/output) contention and memory, for example, among other resources.

Following are two specific example options of scheduling algorithms: partition major and partition minor. First, consider the build of an index with four partitions and each partition has six segments. The index build can be run with the degree of parallelism at four.

(1) Partition Major: Concurrently work on multiple segments within a partition
  W1—Partition 1, segment 1
  W2—Partition 1, segment 2
  W3—Partition 1, segment 3
  W4—Partition 1, segment 4
  W1—Partition 1, segment 5 (W1 finishes (partition 1, segment 1) then it picks up (partition 1, segment 5))
  . . .

(2) Partition Minor: Concurrently work on different partitions
  W1—Partition 1, segment 1
  W2—Partition 2, segment 1
  W3—Partition 3, segment 1
  W4—Partition 4, segment 1
  W1—Partition 1, segment 2 (W1 finishes (partition 1, segment 1) then it picks up (partition 1, segment 2))
  . . .

Option (1) is chosen to reduce memory usage, since in general, there is only about one partition index build active. Option (2) is chosen to reduce the I/O contention among threads, especially when partitions are on different file groups and on different disks. This also reduces processor contention, if there are any intra-partition dependencies.

The storage engine is responsible for building index segments and, sharing a string dictionary and numeric dictionary among threads. This makes query plan execution on top of the storage engine the same for column store and row store datastores. Any segments the processing of which is helped by the addition of helper threads, shall receive such threads to minimize overall index build time.

Figure 3:
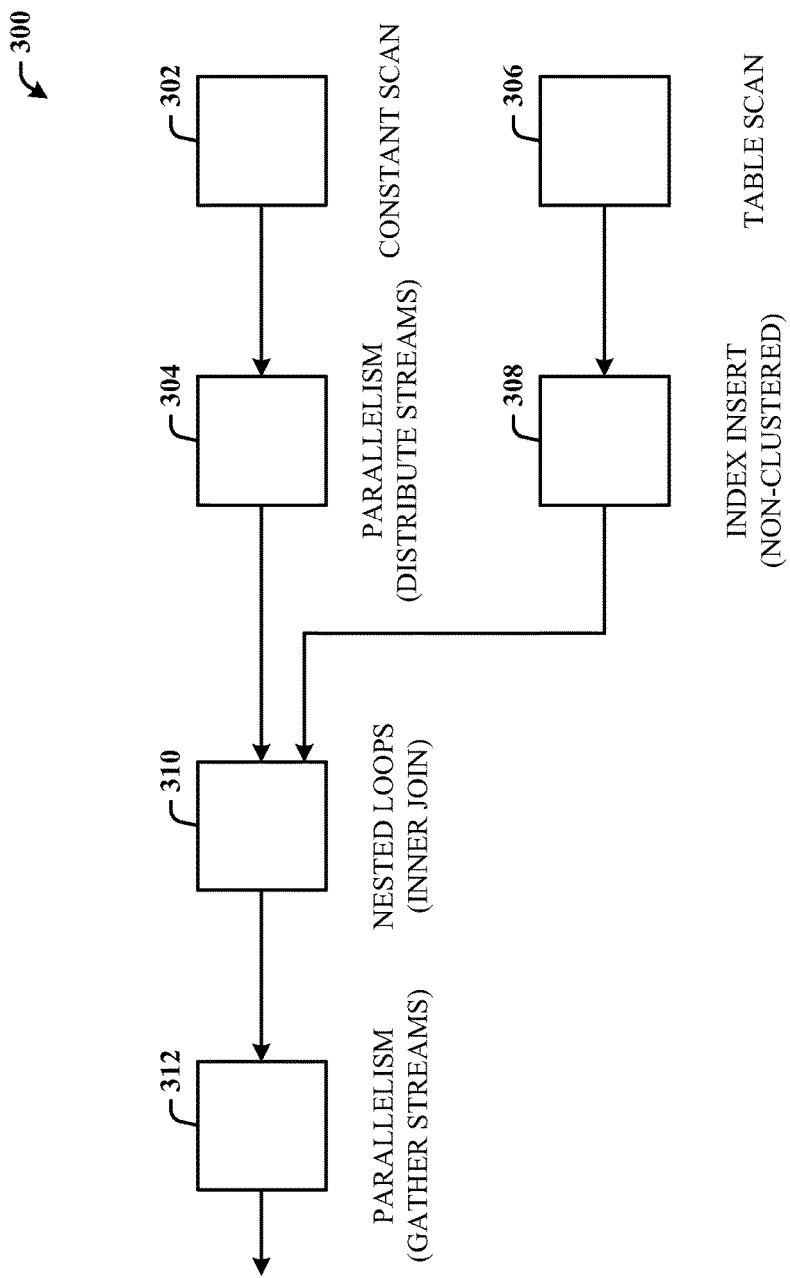
FIG. 3 illustrates an exemplary column store build plan for both partitioned and non-partitioned indexes.

FIG. 3 illustrates an exemplary column store build plan 300 for both partitioned and non-partitioned indexes. The plan design removes sort and add memory grants in the non-partitioned case. Two columns are added to constant table scan on the outer side: a first column for partitionID (the same as in a row store), a second column is the number of worker threads associated with this partition. This can be determined by the cardinality of the partition in the compiling time. Additionally, an index insert iterator can access both columns and pass the column data to storage engine.

The plan 300 includes a first nested loop that comprises a constant scan 302 and parallelism 304, and a second nested loop that comprises a table scan 306 and index insert 308. The nested loops are joined at an inner join 310, with flow to parallelism 312. Following is code that represents the plan 300 of FIG. 3.

insert [dbo].[p] select*, %%bmk%% from [dbo].[p]
  |--Parallelism (Gather Streams)
    |--Nested Loops(Inner Join, OUTER REFERENCES:(
      [Expr1014], [Expr1015]))
      |--Parallelism (Distribute Streams, Demand Partitioning)
        |--Constant Scan (VALUES:(((1), (2)), ((1), (2)), ((2), 1)))
      |--Index Insert (OBJECT:[test].[dbo].[p].[pc1]))
        |--Table Scan (OBJECT: [test].[dbo].[P]),
SEEK:([PtnId1001]=[Expr1014]) ORDERED FORWARD)

Figure 4:
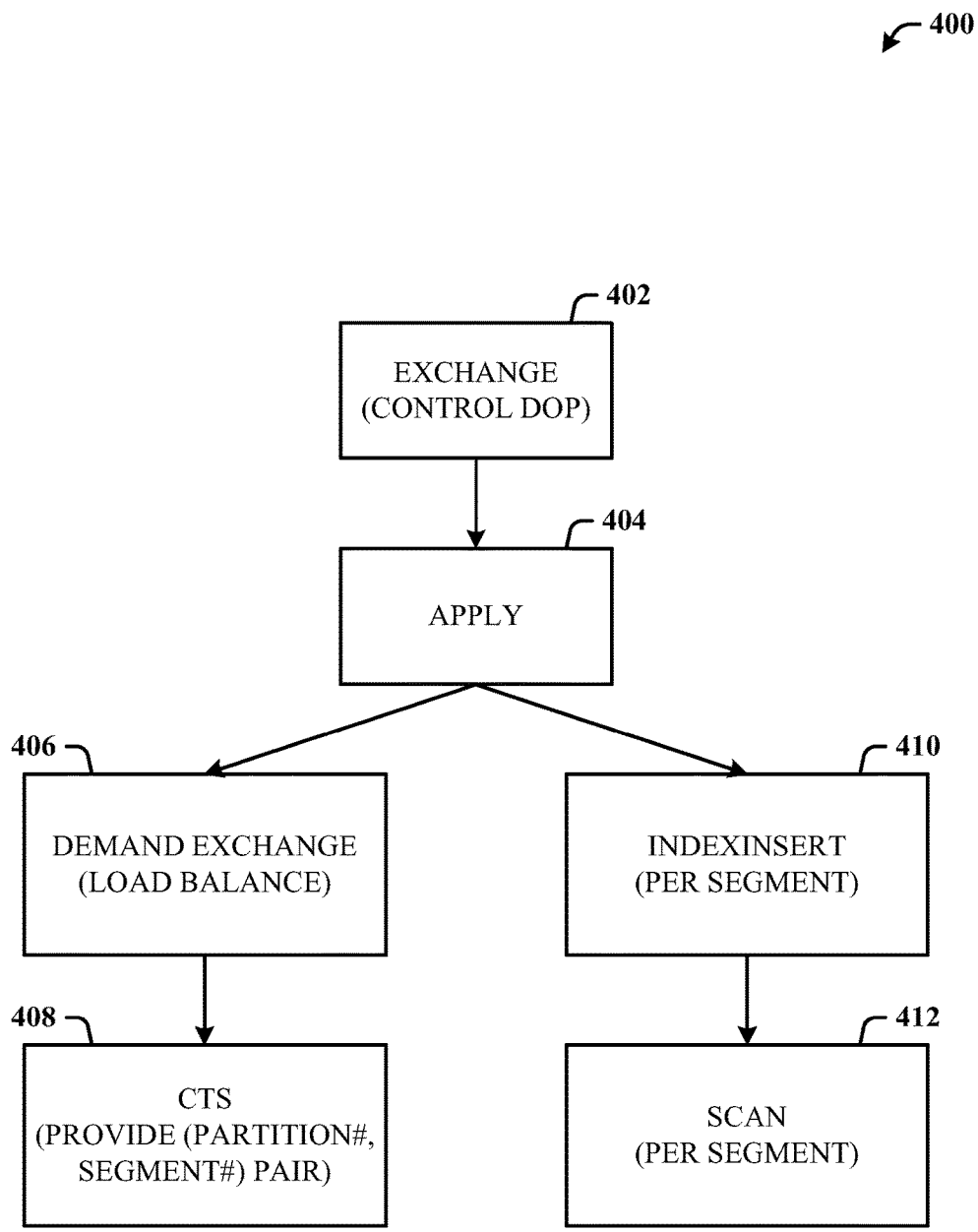
FIG. 4 illustrates a flow diagram that represents detailed analysis of a column store index plan.

FIG. 4 illustrates a flow diagram 400 that represents detailed analysis of a column store index plan. At 402, an exchange process is performed to control the degree of parallelism (DOP). This is to dynamically adjust the DOP and memory usage before execution begins to fully utilize available machine resources at the time of execution. At 404, the DOP is applied in two paths. At 406, the pull method (demand exchange operator) is employed to extract the list of segments to work on. At 408, partitionID/segmentID tuples are provided. At 410, an index insert is performed per segment. At 412, a scan is performed for each segment.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 5:
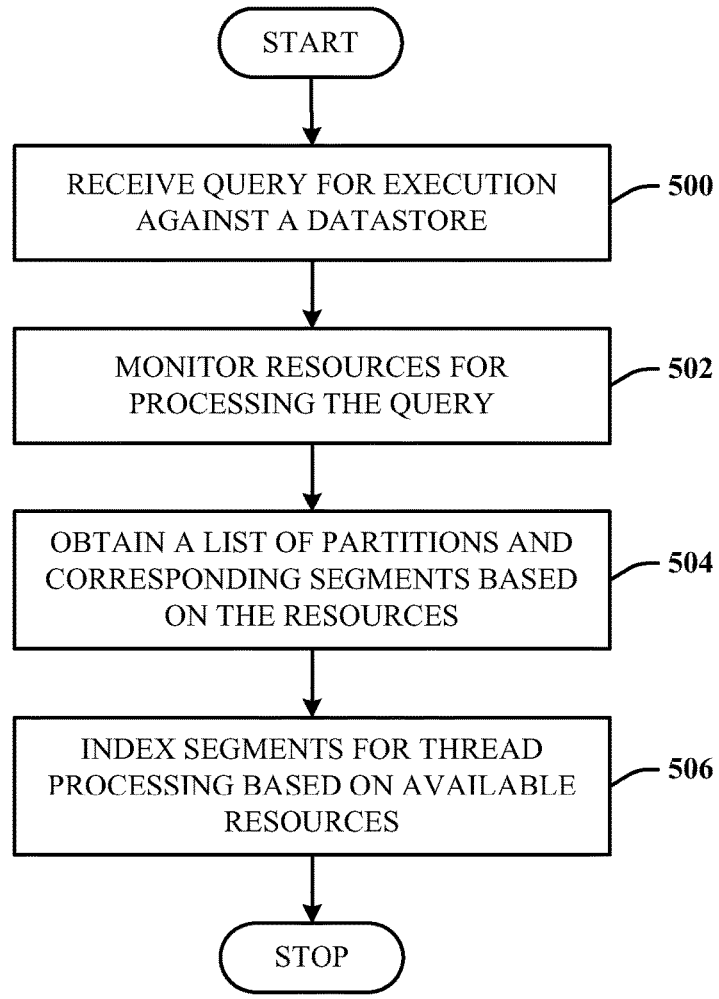
FIG. 5 illustrates a computer-implemented indexing method in accordance with the disclosed architecture.

FIG. 5 illustrates a computer-implemented indexing method in accordance with the disclosed architecture. At 500, a query is received for execution against a datastore. The datastore can be a column store and/or row store. At 502, resources are monitored for processing the query. At 504, a list of partitions and corresponding segments is obtained based on the resources. At 506, the segments are indexed for thread processing based on available resources.

Figure 6:
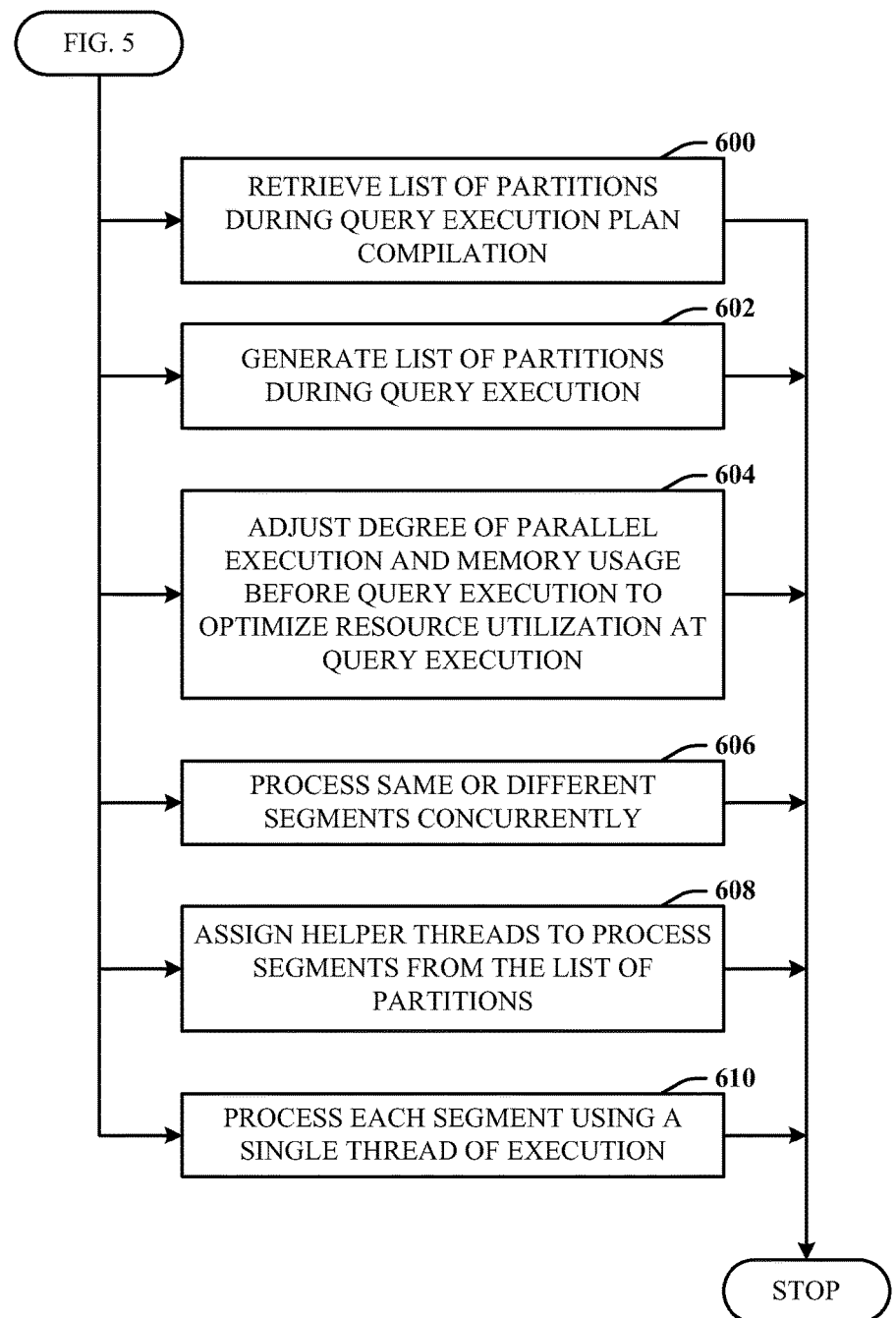
FIG. 6 illustrates further aspects of the method of FIG. 5.

FIG. 6 illustrates further aspects of the method of FIG. 5. At 600, the list of partitions is retrieved during query execution plan compilation. At 602, the list of partitions is generated during query execution. At 604, a degree of parallel execution and memory usage is adjusted before query execution to optimize resource utilization at query execution. At 606, same or different segments are processed concurrently. At 608, helper threads are assigned to process segments from the list of partitions. At 610, each segment is processed using a single thread of execution.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
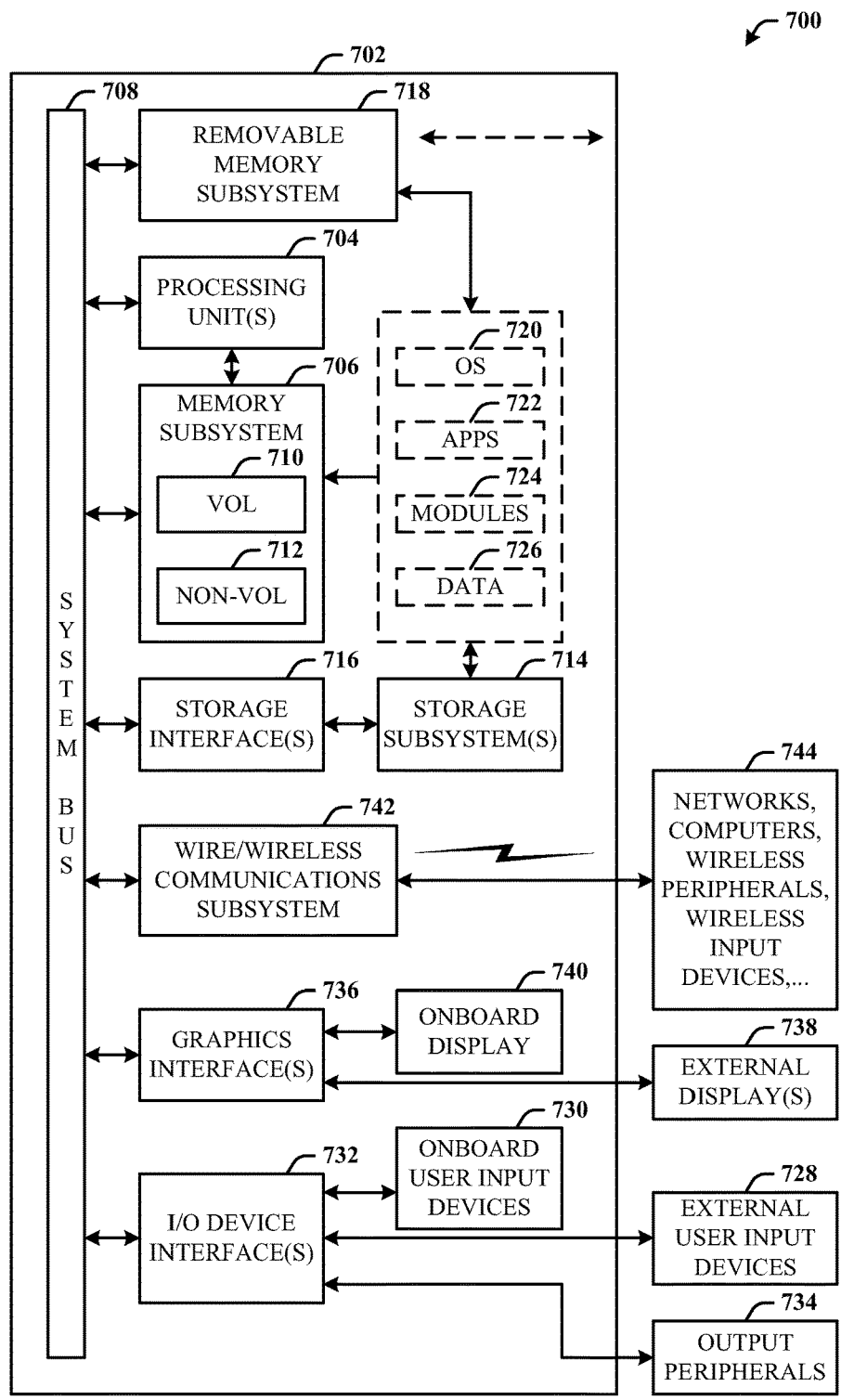
FIG. 7 illustrates a block diagram of a computing system that executes index build for datastores in accordance with the disclosed architecture.

Referring now to FIG. 7, there is illustrated a block diagram of a computing system 700 that executes index build for datastores in accordance with the disclosed architecture. In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 700 for implementing various aspects includes the computer 702 having processing unit(s) 704, a computer-readable storage such as a system memory 706, and a system bus 708. The processing unit(s) 704 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 706 can include computer-readable storage (physical storage media) such as a volatile (VOL) memory 710 (e.g., random access memory (RAM)) and non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the processing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components. The storage subsystem(s) 714 (physical storage media) can include one or more of a hard disk drive (HDD), a magnetic floppy disk drive (FDD), and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The one or more application programs 722, other program modules 724, and program data 726 can include the entities and components of the system 100 of FIG. 1, the entities and components of the system 200 of FIG. 2, the index plan 300 of FIG. 3, the entities and flow of the diagram 400 of FIG. 4, and the methods represented by the flowcharts of FIGS. 5-6, for example.

Generally, programs include routines, methods, data structures, other software components, etc., that perform particular tasks or implement particular abstract data types. All or portions of the operating system 720, applications 722, modules 724, and/or data 726 can also be cached in memory such as the volatile memory 710, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so forth. Computer readable media can be any available media that can be accessed by the computer 702 and includes volatile and non-volatile internal and/or external media that is removable or non-removable. For the computer 702, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 702, programs, and data using external user input devices 728 such as a keyboard and a mouse. Other external user input devices 728 can include a microphone, an IR (infrared) remote control, a joystick, a game pad, camera recognition systems, a stylus pen, touch screen, gesture systems (e.g., eye movement, head movement, etc.), and/or the like. The user can interact with the computer 702, programs, and data using onboard user input devices 730 such a touchpad, microphone, keyboard, etc., where the computer 702 is a portable computer, for example. These and other input devices are connected to the processing unit(s) 704 through input/output (I/O) device interface(s) 732 via the system bus 708, but can be connected by other interfaces such as a parallel port, IEEE 1394 serial port, a game port, a USB port, an IR interface, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computing device, comprising:
  a memory and a processor that are respectively configured to store and execute instructions, including instructions for causing the computing device to perform operations, the operations comprising:
    receiving a request to execute a query;
    selecting a segment size for partitions corresponding to the requested query;
    creating an index based on the selected segment size; and
    processing segments according to the index based on a resource optimization determined at an execution time of the requested query.

2. The computing device of claim 1, wherein the operations further comprise:
  dynamically adjusting a degree of parallelism associated with a processing of the segments based on the resource optimization.

3. The computing device of claim 1, wherein the operations further comprise:
  determining the resource optimization according to available resources at the execution time.

4. The computing device of claim 1, wherein the operations further comprise:
  obtaining a list of partitions by accessing a datastore.

5. The computing device of claim 1, wherein each of the segments is processed by a single thread.

6. The computing device of claim 1, wherein the operations further comprise:
assigning helper threads to process the segments.

7. The computing device of claim 1, wherein the partitions include a partitioned table, and wherein a non-partitioned table is processed as a particular partitioned table of only one partition.

8. The computing device of claim 1, wherein the operations further comprise:
concurrently processing multiple segments of a partition if the resource optimization is determined to be a reduction of memory usage; and
concurrently processing different partitions if the resource optimization is determined to be a reduction of input/output contention.

9. The computing device of claim 1, wherein the operations further comprise:
assigning segments to worker threads according to a load balancing of resources, the load balancing based on the segment size and a number of worker threads.

10. A computer-readable storage memory comprising computer-executable instructions which when executed cause a computing device to perform operations, the operations including:
receiving a query to be executed against a data store;
obtaining a list of partitions and corresponding segments;
selecting a segment size for the partitions corresponding to the query to be executed;
determining, in response to the received query, a resource optimization for processing the segments; and
processing the segments according to the determined resource optimization.

11. The computer-readable storage memory of claim 10, wherein the operations further include:
dynamically adjusting a degree of parallelism associated with the processing of the segments according to the determined resource optimization.

12. The computer-readable storage memory of claim 10, wherein the determining of the resource optimization includes determining the resource optimization according to available resources at a query execution time.

13. The computer-readable storage memory of claim 10, wherein the operations further include:
concurrently processing multiple segments of a partition if the determined resource optimization is to be a reduction of memory usage.

14. The computer-readable storage memory of claim 10, wherein the operations further include:
concurrently processing different partitions if the determined resource optimization is to be a reduction of input/output contention.

15. A computer-implemented indexing method executable via a processor and memory, comprising:
receiving a query to be executed against a data store;
obtaining a list of partitions and corresponding segments;
selecting a segment size for the partitions corresponding to the query to be executed;
determining, in response to the received query, a resource optimization for processing the segments; and
processing the segments according to the determined resource optimization.

16. The method of claim 15, further comprising:
retrieving a list of partitions during a compilation of a query execution plan.

17. The method of claim 15, further comprising:
generating a list of partitions during an execution of the query.

18. The method of claim 15, further comprising:
adjusting a memory usage before an execution of the query.

19. The method of claim 15, further comprising:
processing same or different segments concurrently.

20. The method of claim 15, further comprising:
dynamically adjusting a degree of parallelism associated with the processing of the segments based on the resource optimization, wherein the resource optimization is determined according to available resources at a time of an execution of the query.

* * * * *